US010112252B2

(12) United States Patent
Romenesko et al.

(10) Patent No.: US 10,112,252 B2
(45) Date of Patent: Oct. 30, 2018

(54) WIRE FEEDER TENSIONER WITH DEFINITIVE SETTINGS

(71) Applicant: ILLINOIS TOOL WORKS INC., Glenview, IL (US)

(72) Inventors: Benjamin David Romenesko, Hortonville, WI (US); Paul William Garvey, Kaukauna, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 15/441,072

(22) Filed: Feb. 23, 2017

(65) Prior Publication Data

US 2017/0157694 A1 Jun. 8, 2017

Related U.S. Application Data

(62) Division of application No. 13/430,912, filed on Mar. 27, 2012, now Pat. No. 9,586,283.

(60) Provisional application No. 61/468,844, filed on Mar. 29, 2011.

(51) Int. Cl.
*B23K 9/133* (2006.01)
*B65H 59/22* (2006.01)

(52) U.S. Cl.
CPC ......... *B23K 9/1336* (2013.01); *B65H 59/225* (2013.01); *B65H 2701/36* (2013.01)

(58) Field of Classification Search
CPC ........ B23K 9/124; B23K 9/125; B23K 9/173; B23K 9/1336; B23K 9/133; B65H 59/225
USPC ......... 219/137.7, 137.31, 136, 242; 226/174, 226/195
See application file for complete search history.

(56) References Cited

U.S. PATENT DOCUMENTS 2,767,302 A 10/1956 Brashear, Jr.
3,107,291 A 10/1963 Evans
3,248,516 A 4/1966 Gilliland
(Continued)

FOREIGN PATENT DOCUMENTS

GB 1125440 A 8/1968
JP 2000079475 3/2000
(Continued)

OTHER PUBLICATIONS

International Search Report from PCT application No. PCT/US2011/064716 dated Apr. 4, 2012, 11 pgs.
(Continued)

*Primary Examiner* — Dana Ross
*Assistant Examiner* — James Sims, III
(74) *Attorney, Agent, or Firm* — McAndrews, Held & Malloy, Ltd.

(57) ABSTRACT

A wire feeder includes a tensioner with a discrete number of compressive force settings for applying a desired compressive force to welding wire fed through the wire feeder is provided. The tensioner includes an adjustment knob with a discrete number of detents disposed along a helical surface adjacent an inner bore of the adjustment knob. The tensioner also includes a pin extending from an end of a tensioning post located in the inner bore, the pin being configured to align with the detents of the adjustment knob. Rotation of the adjustment knob adjusts alignment of the pin among the discrete number of detents, which correspond to the discrete number of compressive force settings.

10 Claims, 7 Drawing Sheets

(56) References Cited

U.S. PATENT DOCUMENTS 3,309,497 A 3/1967 Kensrue
3,331,545 A 7/1967 Olivieri
3,382,398 A 5/1968 Austin
3,430,832 A 3/1969 Meyer
3,570,325 A 3/1971 Kroll
3,576,966 A 5/1971 Sullivan
3,675,837 A 7/1972 Gerould
3,718,798 A 2/1973 Randolph
4,083,079 A 4/1978 Vermillion
4,276,461 A * 6/1981 Piber .................... H01H 9/061 200/321
5,223,671 A 6/1993 Alfieri
5,743,140 A 4/1998 Gustafson
5,816,466 A 10/1998 Seufer
5,918,195 A * 6/1999 Halgrimson ........... A01B 63/00 318/624
6,137,057 A 10/2000 Gutgsell
6,356,045 B1 * 3/2002 Newton ............... G05B 19/042 318/561
6,388,234 B1 5/2002 Collins
6,427,894 B1 8/2002 Blank
6,479,795 B1 11/2002 Albrecht
6,568,578 B1 5/2003 Kensrue
6,658,960 B2 * 12/2003 Babin .................. F16H 59/105 74/335
6,868,590 B2 3/2005 Bentrim
6,903,305 B2 6/2005 Mukai
6,979,785 B2 12/2005 Yamasaki
7,026,574 B2 4/2006 Belfiore
7,124,697 B2 10/2006 Foley
7,238,918 B2 7/2007 Matiash
7,374,074 B2 5/2008 Matiash
7,415,791 B2 8/2008 Williams, III
7,427,726 B2 9/2008 Enyedy
7,441,682 B2 10/2008 Kerekes
7,520,720 B2 4/2009 Welch
7,531,768 B2 5/2009 Matiash
7,615,718 B2 11/2009 Byerly
7,687,742 B2 3/2010 Belfiore
7,692,117 B2 4/2010 Belfiore
7,767,934 B2 8/2010 Christopher
7,977,604 B2 7/2011 Ertmer
8,276,307 B2 10/2012 Deros
8,450,647 B2 5/2013 Leiteritz
2004/0016736 A1 1/2004 Huismann
2004/0104614 A1 6/2004 Higley
2005/0016976 A1 1/2005 Belfiore
2005/0040202 A1 2/2005 Kerekes
2005/0224484 A1 10/2005 Matiash
2005/0224550 A1 10/2005 Matiash
2006/0138114 A1 6/2006 Belfiore
2007/0108172 A1 * 5/2007 Belfiore ............... B23K 9/1336 219/137.7
2008/0035625 A1 * 2/2008 Ertmer ................ B23K 9/1336 219/137.7
2008/0035626 A1 2/2008 Christopher
2008/0296278 A1 * 12/2008 Meckler ................ B23K 9/124 219/137.71
2009/0242535 A1 10/2009 Minato
2009/0277890 A1 11/2009 Leiteritz
2010/0133788 A1 6/2010 Cunningham
2012/0125905 A1 5/2012 Anzengruber
2012/0152926 A1 6/2012 Matiash
2012/0186689 A1 7/2012 Burns
2012/0298082 A1 11/2012 Agemura

FOREIGN PATENT DOCUMENTS

JP 2003001421 A 1/2003
WO 0003295 A1 1/2000
WO 02096234 A1 12/2002

OTHER PUBLICATIONS

International Search Report from PCT application No. PCT/US2012/030828 dated Jul. 16, 2012, 10 pgs.

* cited by examiner 10
20
30
24
32
28
22
GAS SOURCE
26
16
18
POWER SOURCE
POWER SUPPLY
12
14
34
36

20
44
52
32
30
50
42
TO TORCH
24
48
62
56
MEMORY CIRCUITRY
OPERATOR INTERFACE
46
PROCESSING CIRCUITRY
54
MOTOR DRIVE CIRCUIT
60
58
TO POWER SUPPLY
INTERFACE CIRCUITRY
28

131
80
126
76
114
130
116
118
120
130
138
136
122
124
134
132
128

128
152
150
131
148
126

128
158
150
152
148
148
76
124
122
80
116
118
114
120
132

124
150
150
76
148
122
80
118
114
116
120
160
160
132

158
152
170
76
150
80
148
122
148

124
150
131
152
170

158
182
131
152
80
76
184
180
178
186
122
178

124
186
184
180
182
152

WIRE FEEDER TENSIONER WITH DEFINITIVE SETTINGS

CROSS REFERENCE TO RELATED APPLICATIONS

This application is a Divisional Application of U.S. patent application Ser. No. 13/430,912, entitled "Wire Feeder Tensioner with Definitive Settings," filed Mar. 27, 2012, which claims priority to and benefit of U.S. Patent Application No. 61/468,844, entitled "Wirefeeder Drive Tension Adjustment Knob with Definitive Settings," filed Mar. 29, 2011, each of which is herein incorporated by reference.

BACKGROUND

The invention relates generally to welding systems and, more particularly, to a tension adjustment knob with discrete settings for use in welding wire feeders.

Welding is a process that has increasingly become ubiquitous in various industries and applications. While such processes may be automated in certain contexts, a large number of applications continue to exist for manual welding operations. Such welding operations rely on a variety of types of equipment to ensure the supply of welding consumables (e.g., wire feed, shielding gas, etc.) is provided to the weld in an appropriate amount at a desired time. For example, metal inert gas (MIG) welding typically relies on a wire feeder to ensure a proper wire feed reaches a welding torch.

Such wire feeders facilitate the feeding of welding wire from a wire spool, through a pair of drive wheels, to the welding torch at a desired wire feed rate. A mechanism such as a tensioner may be used to lower one drive wheel toward the other, applying a compressive force to the wire between the drive wheels. Such tensioners typically allow an operator to continuously manually adjust the compressive force applied to the welding wire based on the type of wire used or the desired wire feed speed. However, such continuous tensioner adjustment may permit the operator to adjust the tensioner to apply a compressive force that is higher or lower than the desired compressive force for the specific welding application.

BRIEF DESCRIPTION

In an exemplary embodiment, a welding system includes a welding wire feeder. The welding wire feeder includes a welding drive assembly housing, a drive wheel, a clamp arm configured to pivot at a first end about a clamp arm joint of the welding drive assembly housing, and a tensioner configured to pivot about a tensioner joint of the welding drive assembly housing. The drive wheel is configured to rotate with respect to the welding drive assembly housing. The clamp arm is configured to transfer a compressive force from the drive wheel to welding wire fed through the welding wire feeder. The tensioner includes an adjustment knob, and rotation of the adjustment knob adjusts the compressive force transferred from the drive wheel to the welding wire among a discrete number of compressive force settings.

In another embodiment, a welding wire feeder includes a tensioner configured to pivot about a tensioner joint. The tensioner includes an adjustment knob including a discrete number of detents, a cup assembly into which a lower portion of the adjustment knob is disposed, a spring disposed axially between the adjustment knob and the cup assembly, and a tensioning post disposed within inner bores of both the adjustment knob and the cup assembly. The tensioner joint extends through a first end of the tensioning post. The tensioner also includes a pin extending from a second end of the tensioning post that is opposite the first end of the tensioning post, wherein the pin is configured to align with the detents in the adjustment knob. Rotation of the adjustment knob adjusts a compressive force transferred from a drive wheel to welding wire among a discrete number of compressive force settings that directly correspond to the discrete number of detents in the adjustment knob.

In a further embodiment, a welding wire tensioner includes an adjustment knob comprising a discrete number of detents disposed along a helical surface adjacent an inner bore of the adjustment knob, a tensioning post disposed within the inner bore of the adjustment knob, and a pin extending radially from an end of the tensioning post. The pin is configured to align with the detents of the adjustment knob, and rotation of the adjustment knob adjusts alignment of the pin among the discrete number of detents.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Present embodiments are directed to welding systems having a welding wire feeder with a tensioner for adjusting the compressive force applied to welding wire fed through the welding wire feeder. The tensioner includes an adjustment knob that may be rotated to adjust the compressive force among a discrete number of compressive force settings. The tensioner may also include a spring, cup assembly, tensioning post, and pin. When the adjustment knob is rotated, the pin rides along a helical surface formed in the adjustment knob, allowing the adjustment knob to move relative the other tensioner components such that the spring is compressed or decompressed. Consequently, the spring may exert a force on a clamp arm of the wire feeder to increase or decrease the compressive force on the welding wire. A discrete number of detents are located along the helical surface, each detent corresponding to a different compressive force setting. Thus, an operator may rotate the adjustment knob of the tensioner to align the pin with a desired detent to apply a desired compressive force to the welding wire.

Figure 1:
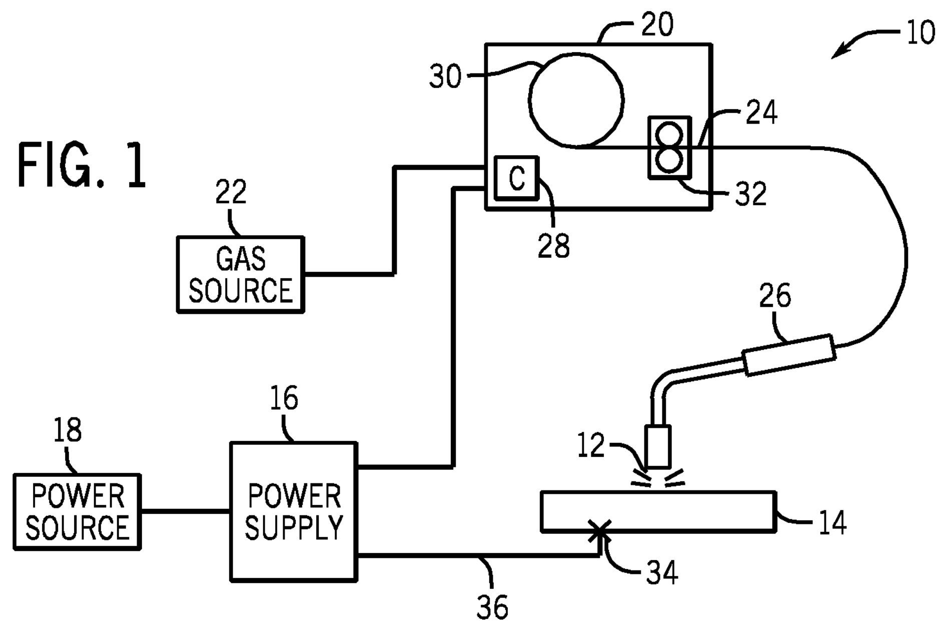
FIG. 1 is a block diagram of an embodiment of a welding system utilizing a wire feeder that may include a tension adjustment knob with discrete settings.

FIG. 1 is a block diagram of an embodiment of a welding system 10 in accordance with present techniques. The welding system 10 is designed to produce a welding arc 12 on a work piece 14. The welding arc 12 may be of any type of weld, and may be oriented in any desired manner, including MIG, metal active gas (MAG), various waveforms, tandem setup, and so forth. The welding system 10 includes a power supply 16 that will typically be coupled to a power source 18, such as a power grid. Other power sources may, of course, be utilized including generators, engine-driven power packs, and so forth. In the illustrated embodiment, a wire feeder 20 is coupled to a gas source 22 and the power source 18, and supplies welding wire 24 to a welding torch 26. The welding wire 24 is fed through the welding torch 26 to the welding arc 12, molten by the welding arc 12, and deposited on the work piece 14.

The wire feeder 20 will typically include control circuitry, illustrated generally by reference numeral 28, which regulates the feed of the welding wire 24 from a spool 30, and commands the output of the power supply 16. The spool 30 will contain a length of welding wire 24 that is consumed during the welding operation. The welding wire 24 is advanced by a wire drive assembly 32, typically through the use of an electric motor under control of the control circuitry 28. In addition, the work piece 14 is coupled to the power supply 16 by a clamp 34 connected to a work cable 36 to complete an electrical circuit when the welding arc 12 is established between the welding torch 26 and the work piece 14.

Placement of the welding torch 26 at a location proximate to the work piece 14 allows electrical current, which is provided by the power supply 16 and routed to the welding torch 26, to arc from the welding torch 26 to the work piece 14. As described above, this arcing completes an electrical circuit that includes the power supply 16, the welding torch 26, the work piece 14, and the work cable 36. Particularly, in operation, electrical current passes from the power supply 16, to the welding torch 26, to the work piece 14, which is typically grounded back to the power supply 16. The arcing generates a relatively large amount of heat that causes part of the work piece 14 and the filler metal of the welding wire 24 to transition to a molten state, thereby forming the weld.

To shield the weld area from being oxidized or contaminated during welding, to enhance arc performance, and to improve the resulting weld, the welding system 10 also feeds an inert shielding gas to the welding torch 26 from the gas source 22. It is worth noting, however, that a variety of shielding materials for protecting the weld location may be employed in addition to, or in place of, the inert shielding gas, including active gases and particulate solids.

Figure 2:
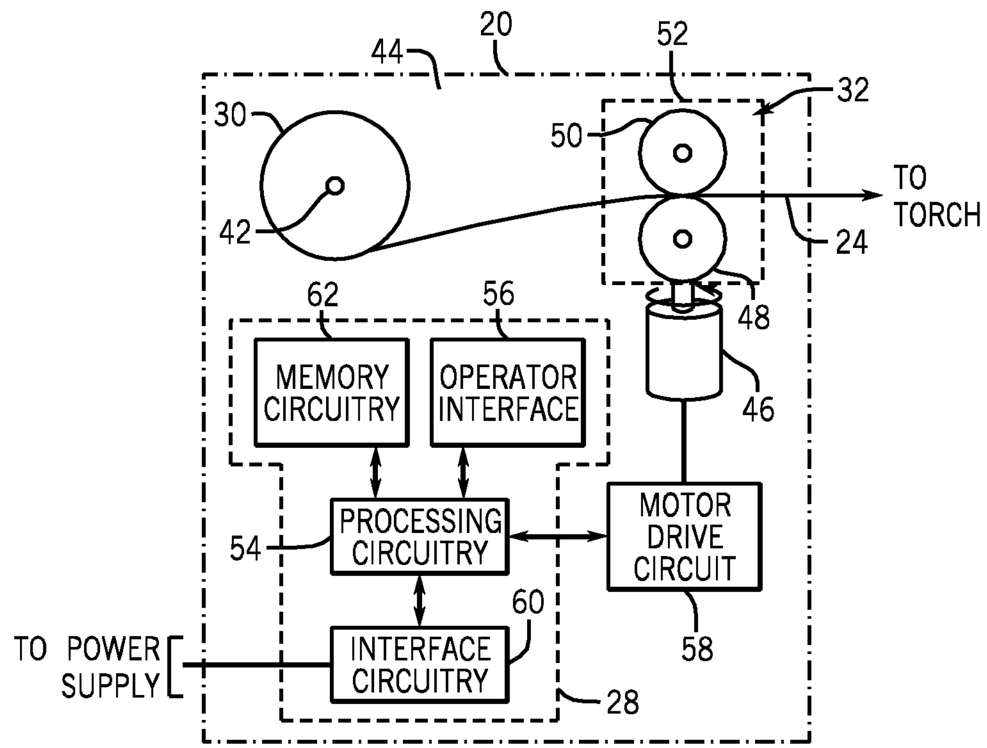
FIG. 2 is a block diagram of an embodiment of certain components of the wire feeder of FIG. 1.

FIG. 2 is a block diagram of an embodiment of certain components of the wire feeder 20 of FIG. 1. As previously described, in certain embodiments, the welding wire 24 is supplied from the spool 30, which may be mounted via a spool mount 42 onto an inner wall 44 of the wire feeder 20. The wire drive assembly 32 facilitates progressive feeding of the welding wire 24 from the spool 30 to the welding torch 26 at a desired rate for the welding application. A feed motor 46 is provided that engages with two drive wheels 48 and 50 to push the welding wire 24 from the wire feeder 20 toward the welding torch 26. In practice, one of the drive wheels (i.e., a driven drive wheel) 48 is mechanically coupled to the feed motor 46 and is rotated by the feed motor 46 to drive the welding wire 24 from the wire feeder 20, while the mating wheel (i.e., an idler drive wheel) 50 is biased toward the welding wire 24 to maintain contact between the two drive wheels 48 and 50 and the welding wire 24. The drive wheels 48 and 50 may be supported in a welding drive assembly housing 52, which may be attached to the inner wall 44 of the wire feeder 20. Both the driven drive wheel 48 and the idler drive wheel 50 are configured to rotate with respect to the welding drive assembly housing 52. The illustrated embodiment shows one pair of drive wheels 48 and 50, however the wire feeder 20 may include multiple pairs of such drive wheels in certain embodiments.

In addition to mechanical components, the wire feeder 20 also includes the control circuitry 28 for controlling the wire feed speed of the welding wire 24 through the wire feeder 20, among other things. In certain embodiments, processing circuitry 54 is coupled to an operator interface 56 on the wire feeder 20 that allows selection of one or more welding parameters, for example, wire feed speed. The operator interface 56 may also allow for selection of such weld parameters as the welding process, the type of welding wire 24 utilized, current, voltage or power settings, and so forth. The processing circuitry 54 communicates with the feed motor 46 via a motor drive circuit 58, allowing control of wire feed speeds in accordance with operator selections. Additionally, the processing circuitry 54 permits these settings to be fed back to the power supply 16 via interface circuitry 60 and/or stored by appropriate memory circuitry 62 for later use. The control circuitry 28 within the wire feeder 20 may also regulate the flow of shielding gas from the gas source 22 to the welding torch 26. In general, such shielding gas is provided at the time of welding, and may be turned on immediately preceding welding and for a short time following welding.

Figure 3:
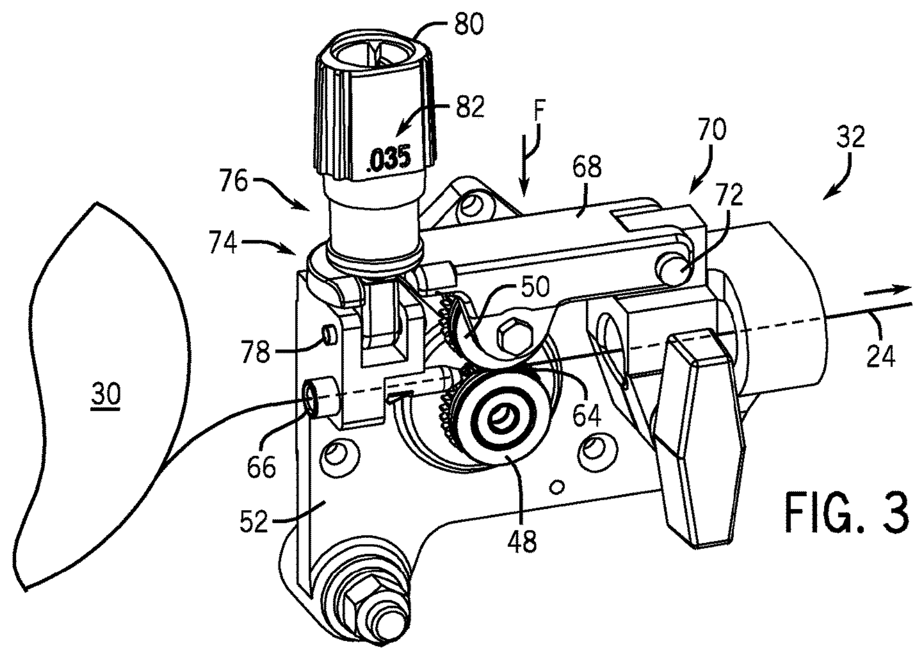
FIG. 3 is a perspective view of an embodiment of certain components of the wire feeder of FIG. 1, including a drive assembly feeding welding wire from a spool to a welding application.

FIG. 3 is a perspective view of an embodiment of certain components of the wire feeder 20 of FIG. 1, including the wire drive assembly 32 feeding welding wire 24 from the spool 30 to a welding application. As previously mentioned, the idler drive wheel 50 engages with the welding wire 24, applying a downward force F to the welding wire 24 for feeding the welding wire 24 between the drive wheels 48 and 50. This downward force F generates traction between the drive wheels 48 and 50 and the welding wire 24, effectively holding the welding wire 24 in alignment through a welding wire feed region 64 located between the drive wheels 48 and 50. The welding wire feed region 64 may be defined by grooves formed along the circumference of the drive wheels 48 and 50 such that the welding wire 24 is held between two aligned grooves, one on each of the drive wheels 48 and 50. A wire inlet guide 66 may direct the welding wire 24 from the spool 30 into the welding wire feed region 64 between the drive wheels 48 and 50. As illustrated, the idler wheel 50 is mounted on a clamp arm 68, which pivots about one end 70 at a pivot point 72 and may be forced downward at an opposite end 74 by a tensioner 76. The tensioner 76 is configured to pivot about a tensioner joint 78 of the welding drive assembly housing 52 in order to secure or release the clamp arm 68. When the clamp arm 68 is secured, the tensioner 76 may apply a desired amount of compressive force F to the clamp arm 68, pushing the idler drive wheel 50 toward the driven drive wheel 48. Adjustment of the compressive force F applied by the tensioner 76 may alter the size of the welding wire feed region 64 between the grooves. A desired compressive force F may be determined based on material properties of the welding wire 24 (e.g., steel versus aluminum welding wire) and/or a desired wire feed speed.

Initial insertion of the welding wire 24 into the welding wire feed region 64 between the drive wheels 48 and 50 may be facilitated by pivoting the clamp arm 68, with the attached idler drive wheel 50, about the pivot point 72, thereby lifting the idler drive wheel 50 away from the driven drive wheel 48. Once the welding wire 24 is positioned as desired between the drive wheels 48 and 50, the tensioner 76 may be engaged with the clamp arm 68, and the amount of force F placed on the clamp arm 68 by the tensioner 76 may be adjusted via an adjustment knob 80 of the tensioner 76. More specifically, an operator may rotate the adjustment knob 80 to compress or release a spring in the tensioner 76, thereby increasing or decreasing the force applied to the clamp arm 68.

In accordance with present embodiments, rotation of the adjustment knob 80 adjusts the compressive force F transferred from the first drive wheel 50 to the welding wire 24 among a discrete number of compressive force settings. Such compressive force settings may each be appropriate for specific types of welding wire. For example, FIG. 3 illustrates the adjustment knob 80 rotated to a position for applying an appropriate compressive force F to feed welding wire 24 that is approximately 0.035 inches in diameter. This welding wire size setting may be displayed in text 82 on the adjustment knob 80 such that when the adjustment knob 80 is positioned at a discrete compressive force setting for 0.035 inch diameter welding wire, an operator may clearly see the setting displayed on the adjustment knob 80.

Figure 4:
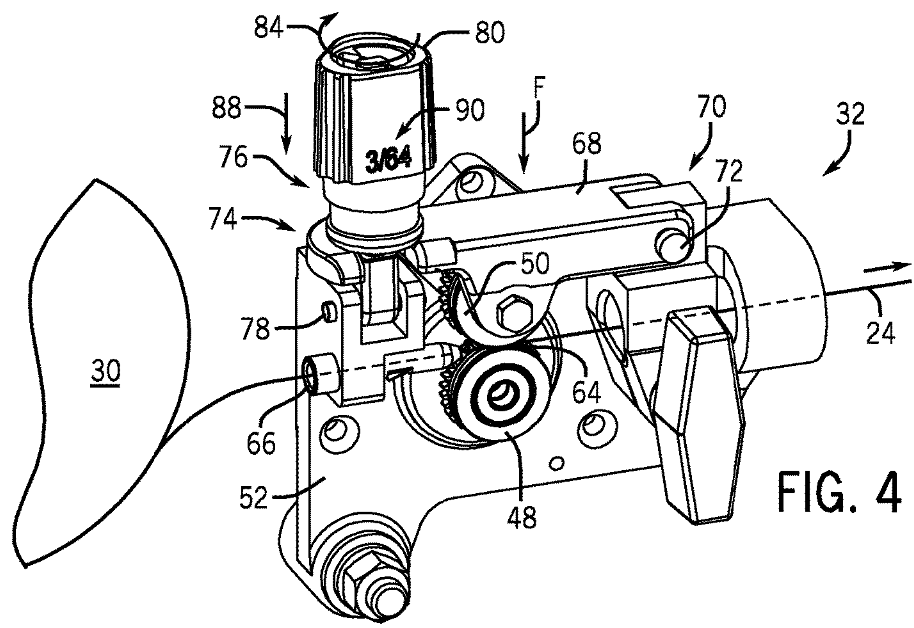
FIG. 4 is a perspective view of an embodiment of certain wire feeder components of FIG. 3 upon adjusting the adjustment knob of the tensioner.

FIG. 4 is a perspective view of an embodiment of certain wire feeder components of FIG. 3 as the compressive force setting of the tensioner 76 is adjusted. A rotation 84 of the adjustment knob 80 lowers the adjustment knob 80 relative to other components of the tensioner 76, as shown by arrow 88. As a result, a spring within the tensioner 76 is compressed to increase the compressive force F delivered to the first drive wheel 50. This compressive force F may correspond to the compressive force setting for 3/64 inch diameter wire, as indicated in text 90 on the adjustment knob 80. The textual indications 82 and 90 may be located along different circumferential positions of the adjustment knob 80, allowing a user to view the compressive force setting (based on wire diameter) to which the tensioner 76 is currently set.

Figure 5:
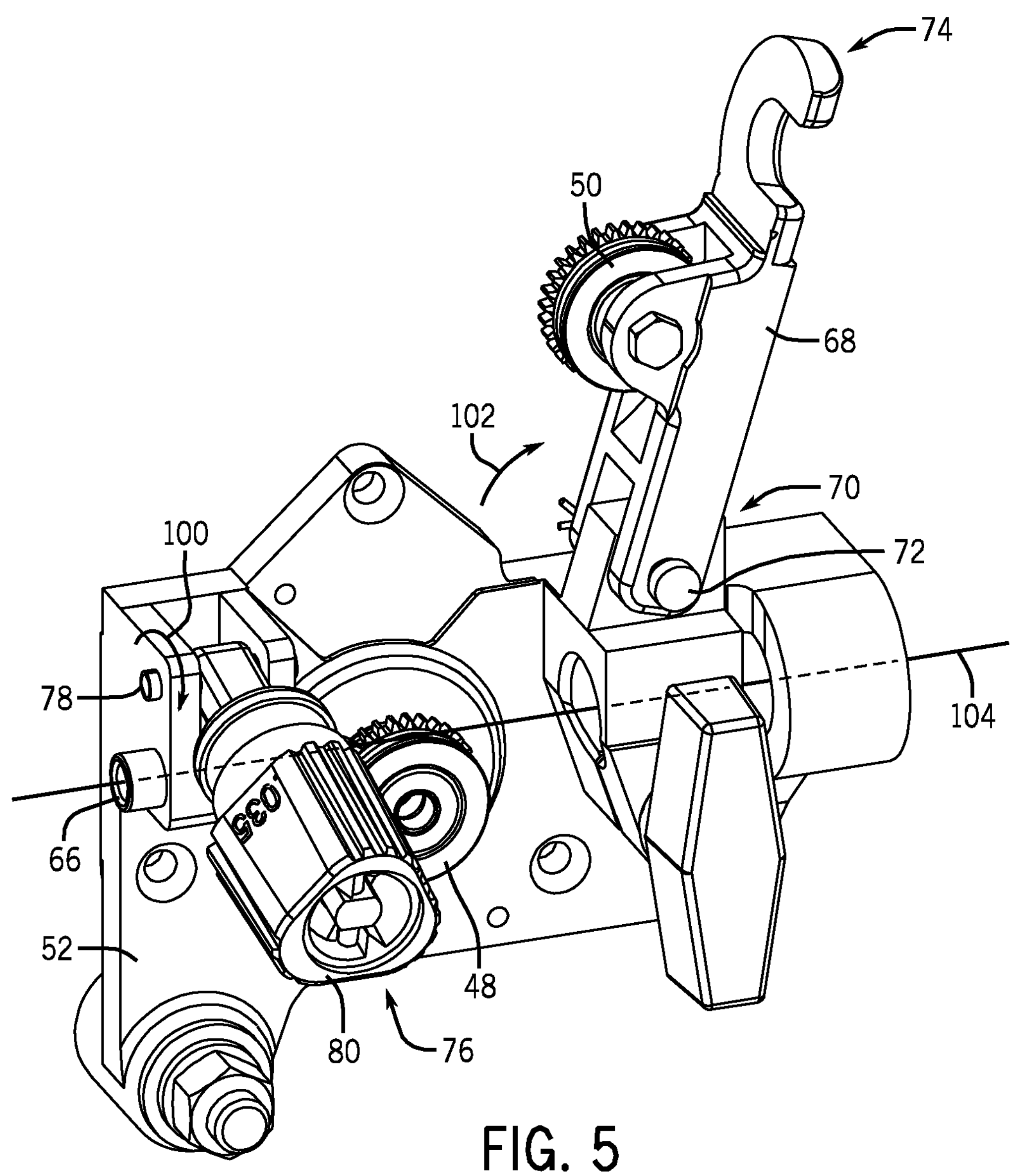
FIG. 5 is a perspective view of an embodiment of certain wire feeder components of FIGS. 3 and 4, having the tensioner pivoted away from the clamp arm, and the clamp arm pivoted away from the wire drive assembly housing.

FIG. 5 is a perspective view of an embodiment of certain components of the wire feeder 20 of FIGS. 3 and 4, having the tensioner 76 pivoted out of engagement with the clamp arm 68, and the clamp arm 68 pivoted away from the welding drive assembly housing 52. The tensioner 76 is pivoted about the tensioner joint 78, (arrow 100), and the clamp arm 68 is pivoted about its pivot point 72 (arrow 102) to lift the idler drive wheel 50 away from the driven drive wheel 48. The illustrated embodiment of the wire drive assembly 32 features a tensioner 76 configured to pivot in a plane generally perpendicular to the direction 104 of the welding wire 24 fed through the wire drive assembly 32. However, the tensioner 76 may be configured to pivot about the tensioner joint in other planes, for example, in a plane generally parallel to the direction 104 of the welding wire 24 fed through the wire drive assembly 32.

Figures 6, 7:
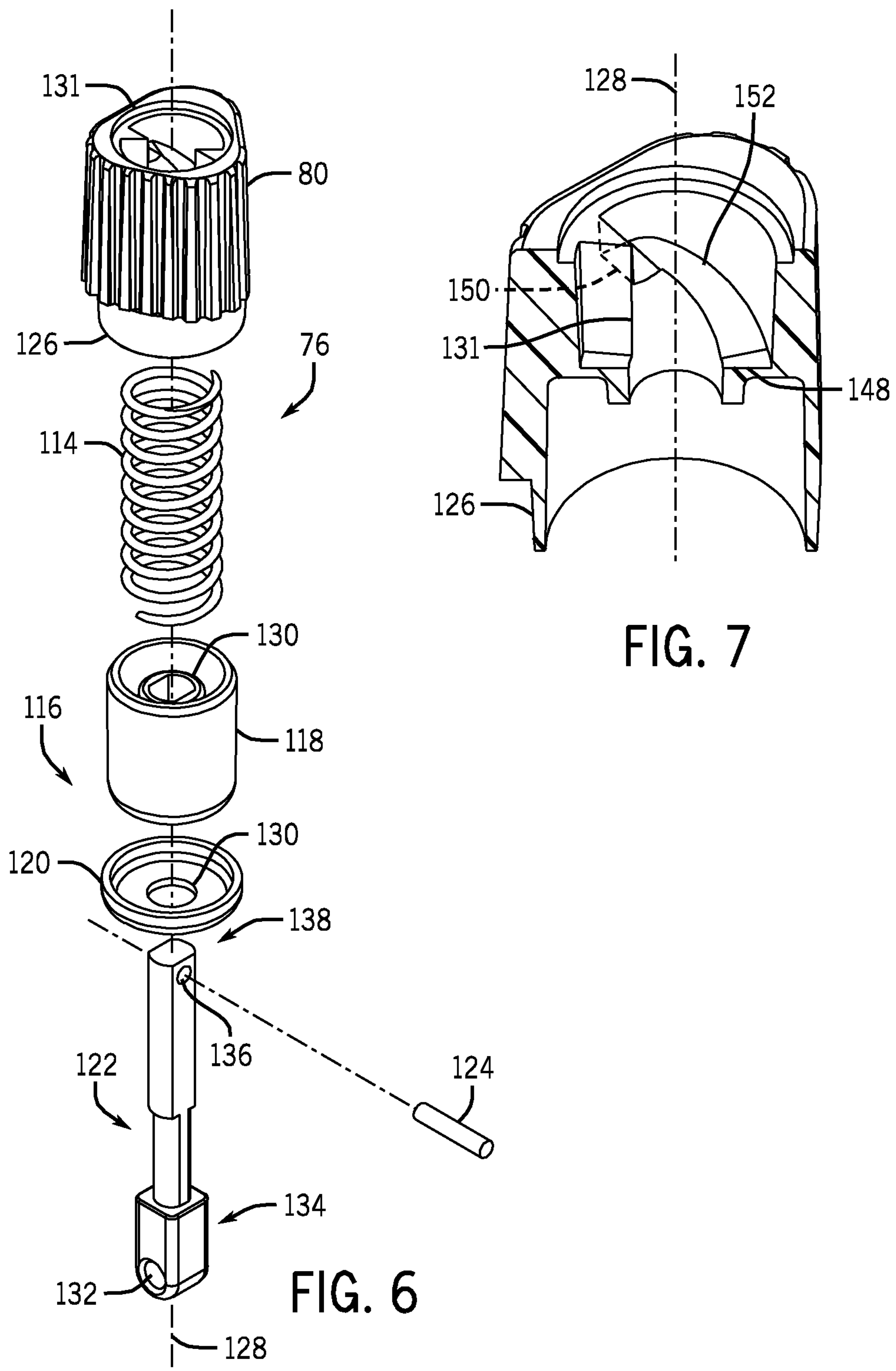
FIG. 6 is an exploded view of an embodiment of a tensioner with an adjustment knob having a discrete number of settings.
FIG. 7 is a perspective cutaway view of an embodiment of the adjustment knob of FIG. 6 having two detents corresponding to two discrete compressive force settings.

FIG. 6 is an exploded view of an embodiment of a tensioner 76 with an adjustment knob 80 having a discrete number of detents corresponding to a discrete number of compressive force settings. The tensioner 76 includes the adjustment knob 80, a spring 114, a cup assembly 116 (having a cup 118 and a base 120), a tensioning post 122, and a pin 124. A lower portion 126 of the adjustment knob 80 is disposed around the cup assembly 116, and the spring 114 is disposed axially, with respect to a tensioner axis 128, between the adjustment knob 80 and the cup assembly 116. The tensioning post 122 is disposed within an inner bore 130 of the cup assembly 116 and an inner bore 131 of the adjustment knob 80, and the tensioning post 122 includes a tensioner aperture 132 extending through a first end 134 of the tensioning post 122. The tensioner aperture 132 is configured to mate with the tensioner joint 78 of the welding drive assembly housing 52. This allows the entire tensioner 76 to pivot about the tensioner joint 78, as previously discussed. The pin 124 may extend from an aperture 136 located at a second end 138 of the tensioning post 122 opposite the first end 134. The pin 124 is configured to align with a discrete number of detents formed in the adjustment knob 80.

Rotating the adjustment knob 80 causes the pin 124 to move relative to the adjustment knob 80 as described in detail below. This movement of the pin 124 forces the tensioning post 122 to move relative to the adjustment knob 80 as well, and this moves the cup assembly 116 up or down relative to the adjustment knob 80. As the cup assembly 116 moves upward, the spring 114 compresses, and the force of the compressed spring 114 transfers to the clamp arm 68, increasing the compressive force F applied to the welding wire 24 in the wire feeder 20. The spring 114 has a specific spring constant relating the compression length of the spring 114 to the resulting spring force that increases or decreases the compressive force F. Therefore, the compressive force F applied by the tensioner 76 may be varied by switching between springs 114 having different spring constants, in addition to rotating the adjustment knob 80.

FIG. 7 is a perspective cutaway view of an embodiment of the adjustment knob 80 of FIG. 6 having two detents 148 and 150 corresponding to two discrete compressive force settings. In addition, the adjustment knob 80 includes a helical surface 152 adjacent the inner bore 131 of the adjustment knob 80, and the detents 148 and 150 are located along the helical surface 152. The helical surface 152, including the detents 148 and 150, may be molded into a surface of the inner bore 131 of the adjustment knob 80. As the adjustment knob 80 is rotated, the pin 124 of the tensioner 76 may travel up or down relative to the adjustment knob 80, supported by the helical surface 152. When the rotation of the adjustment knob 80 stops, the pin 124 may settle into the detent 148 or the detent 150, depending on the relative position of the pin 124 along the helical surface 152. That is, if an operator turns the adjustment knob 80 to a position where the pin 124 is situated on the helical surface 152 between the detents 148 and 150 and the adjustment knob 80 is released, the pin 124 may be forced by the spring 114 to slide or roll down the helical surface 152, coming to rest in the detent 148. However, if the operator rotates the adjustment knob 80 far enough to move the pin 124 along the helical surface 152 and into alignment with the second detent 150, then the detent 150 will resist downward motion of the pin 124 toward the first detent 148. In certain embodiments, another corresponding helical surface 152 may be formed in the adjustment knob 80 along a surface of the inner bore 131 that is substantially opposite the illustrated helical surface 152 within the inner bore 131. This may allow opposite ends of the pin 124 to rest on a respective helical surface 152 of the adjustment knob 80 such that the pin 124 maintains a substantially horizontal orientation. In some embodiments, the pin 124 may be part of the tensioning post 122 that extends to one side of the tensioning post 122 and not the other. In such embodiments, it may not be desirable for the helical surface 152 to be formed in opposite sides of the adjustment knob 80.

It should be noted that the style and outward appearance of the tensioner 76 may conform to an industry standard. Indeed, the tensioner 76 is configured to adjust the compressive force F applied to the welding wire 24 through a rotation 158 of the adjustment knob 80, a method of adjustment that may currently be familiar to welding operators. However, instead of offering a continuous range of compressive force adjustment to the operator, the tensioner 76 provides a discrete number of detents (e.g., 2, 3, 4, 5, or even more detents). This may allow the operator to switch between compressive force settings in a relatively fast and accurate manner. In addition, the discrete number of compressive force settings may allow for easier instructions to be given for deciding an appropriate compressive force setting, and for adjusting the tensioner 76 accordingly, making it less likely that the operator will apply an undesired compressive force.

Figures 8, 9:
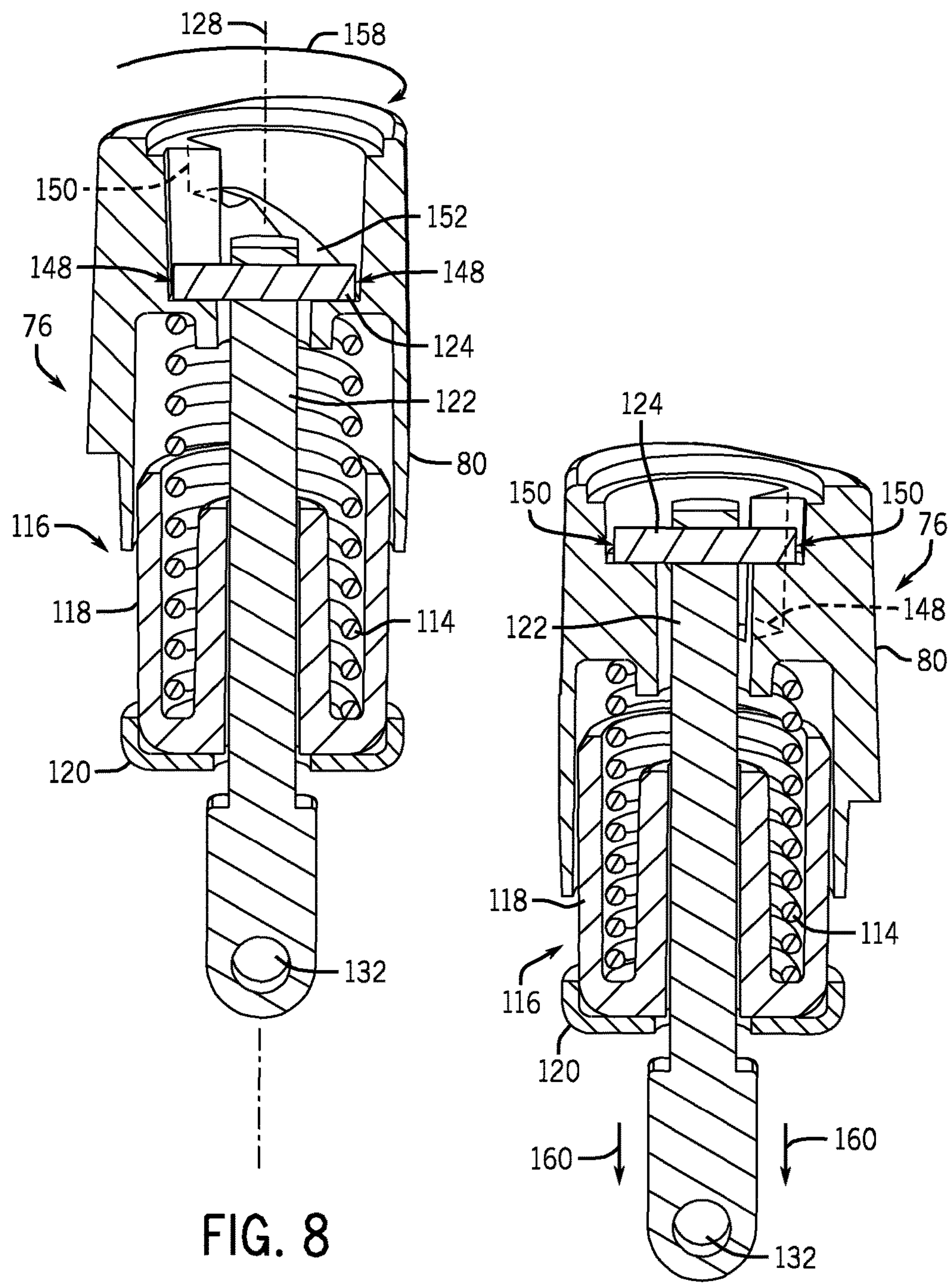
FIG. 8 is a perspective cutaway view of an embodiment of the tensioner of FIG. 6 showing the rotation of the adjustment knob for moving the pin away from the first detent.
FIG. 9 is a perspective cutaway view of an embodiment of the tensioner of FIG. 8 showing the pin aligned with the second detent.

FIGS. 8 and 9 are perspective cutaway views of an embodiment of the tensioner 76 of FIG. 6 showing the rotation 158 of the adjustment knob 80 for moving the pin 124 from alignment with the first detent 148 into alignment with the second detent 150. FIG. 8 shows the pin 124 aligned with the first detent 148. With the tensioner 76 in this position, a spring force exerted by the spring 114 on the adjustment knob 80 may cause the adjustment knob 80 to press upward against the pin 124, thereby holding the pin 124 in the detent 148. The rotation 158 of the adjustment knob 80 about the tensioner axis 128 may be performed manually by an operator or automatically, as discussed in detail below. Such rotation 158 causes the pin 124 to move away from the first detent 148 and along the helical surface 152 of the adjustment knob 80, toward the second detent 150. As previously mentioned, the detents 148 and 150 may correspond to compressive force settings such that when the pin 124 is aligned with the first detent 148, the compressive force F applied to the clamp arm 68 of the wire feeder 20 is a known and desired amount of force for the particular welding wire 24 and wire feed speed. That is, the tensioner 76 may be configured such that when the pin 124 is captured in the first detent 148, the compressive force F may be a force appropriate for feeding welding wire 24 of a certain size (e.g., 0.035 inches in diameter as shown in FIG. 3).

FIG. 9 shows the tensioner 76 having the adjustment knob 80 positioned such that the pin 124 is aligned with the second detent 150. Since the second detent 150 is located at a relatively higher position of the adjustment knob 80 than the first detent 148, the pin 124 may urge the tensioning post 122 to a relatively higher position within the inner bore 131 of the adjustment knob 80. This moves the cup assembly 116 upward relative to the adjustment knob 80, compressing the spring 114. The compressed spring 114 exerts an increased spring force 160 in the downward direction to the cup assembly 116 and the tensioning post 122. The increased spring force 160 may be transferred from the tensioner 76 to the clamp arm 68 via the base 120 of the cup assembly 116, and the compressive force F applied to the welding wire 24 is thus increased. When the pin 124 is captured in the second detent 150 as shown, the compressive force F may be a force appropriate for feeding the welding wire 24 of approximately 3/64 inches in diameter, as shown in FIG. 4.

An operator may rotate the adjustment knob 80 to a position such that the pin 124 is not aligned with either the first detent 148, as shown in FIG. 8 or the second detent 150 of FIG. 9. When the adjustment knob 80 is released while the pin 124 is located along the helical surface 152 between the two detents 148 and 150, the spring 114 pushes against the adjustment knob 80. This may cause the pin 124 to roll or slide along the helical surface 152 of the adjustment knob 80 toward the first detent 148. Thus, if an operator rotates the adjustment knob 80 to a position beyond a desired compressive force setting, the tensioner 76 may automatically adjust the compressive force F applied to the welding wire 24. The illustrated helical surface 152 allows the adjustment knob 80 to either lock into the relatively higher detent 150 or to rotate back to the relatively lower detent 148.

It should be noted that different arrangements of the components of the tensioner 76 may be possible. In certain embodiments, for example, the cup assembly 116 may be one solid component, instead of the separate cup 118 and the base 120. In addition, the components may be any suitable configuration that allows the adjustment knob 80 to be moved relative to the other components in order to adjust a downward force on the tensioning post 122 and cup assembly 116 by compressing or decompressing the spring 114. For example, the pin and helical surface coupling may be established in reverse (i.e., the pin 124 extending from the adjustment knob 80 and the helical surface 152 formed in the tensioning post 122). The helical surface 152 and pin 124 may be formed between the cup assembly 116 and the adjustment knob 80 in certain embodiments. In such embodiments, the helical surface 152, which is shown in the illustrated embodiments as formed inside the adjustment knob 80, may be molded as an external feature on an outer surface of the adjustment knob 80. The cup assembly 116 may be configured to receive the adjustment knob 80 such that the pin 124, extending inward from the cup assembly 116, is supported on the helical surface 152.

Figure 10:
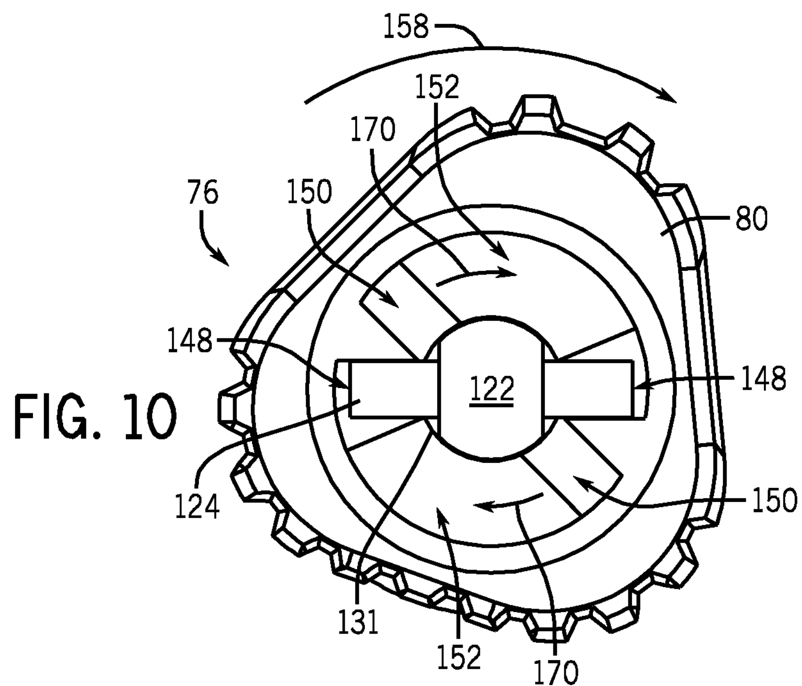
FIG. 10 is a top view of an embodiment of the tensioner of FIG. 6 having two detents corresponding to two discrete compressive force settings.

FIG. 10 is a top view of an embodiment of the tensioner 76 of FIGS. 6-9, with the two detents 148 and 150 corresponding to two distinct compressive force settings. In the illustrated embodiment, the pin 124 is aligned with the first detent 148. The rotation 158 of the adjustment knob 80 in a clockwise direction may bring the second detent 150 toward the pin 124, as indicated by arrows 170. The pin 124, which is disposed in the aperture through the tensioning post 122, may roll or slide along the helical surface 152 as the rotation 158 brings the second detent 150 toward the pin 124. When the pin 124 is aligned with the second detent 150, the detent 150 holds the pin 124 as the tensioner 76 delivers an appropriate compressive force F to the welding drive assembly housing 52. The rotation 158 may be reversed to return the pin 124 from the second detent 150 to the first detent 148, thereby reducing the compressive force F to the previous value.

Figure 11:
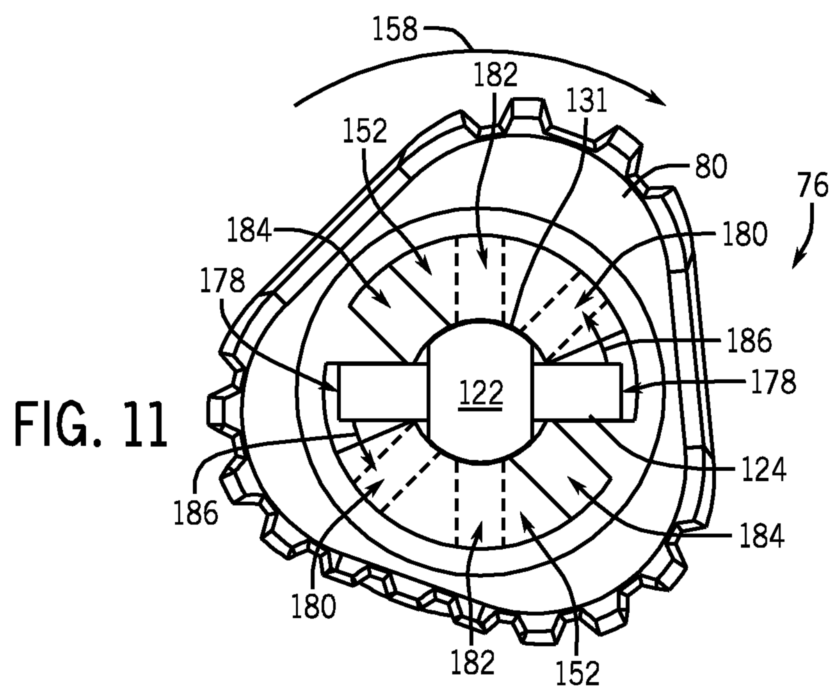
FIG. 11 is a top view of an embodiment of the tensioner of FIG. 6 having four detents corresponding to four discrete compressive force settings.

FIG. 11 is a top view of an embodiment of the tensioner 76 having four detents 178, 180, 182, and 184 corresponding to four distinct compressive force settings of the wire feeder 20. Similar to FIG. 10, the rotation 158 of the adjustment knob 80 may cause the pin 124 to move relative to the adjustment knob 80. More specifically, the pin 124 moves along the helical surface 152 in a direction indicated by arrows 186, from the first detent 178 toward the subsequent detents 180, 182, and 184. A different compressive force setting corresponds to each detent 178, 180, 182, and 184, and the appropriate or desired compressive force setting may be determined based on a size or material of the welding wire 24 or the wire feed speed of the wire feeder 20. Thus, the tensioner 76 may include an adjustment knob 80 having any discrete number of detents for capturing the pin 124 in a position that provides the desired compressive force F to the welding drive assembly housing 52.

Figure 12:
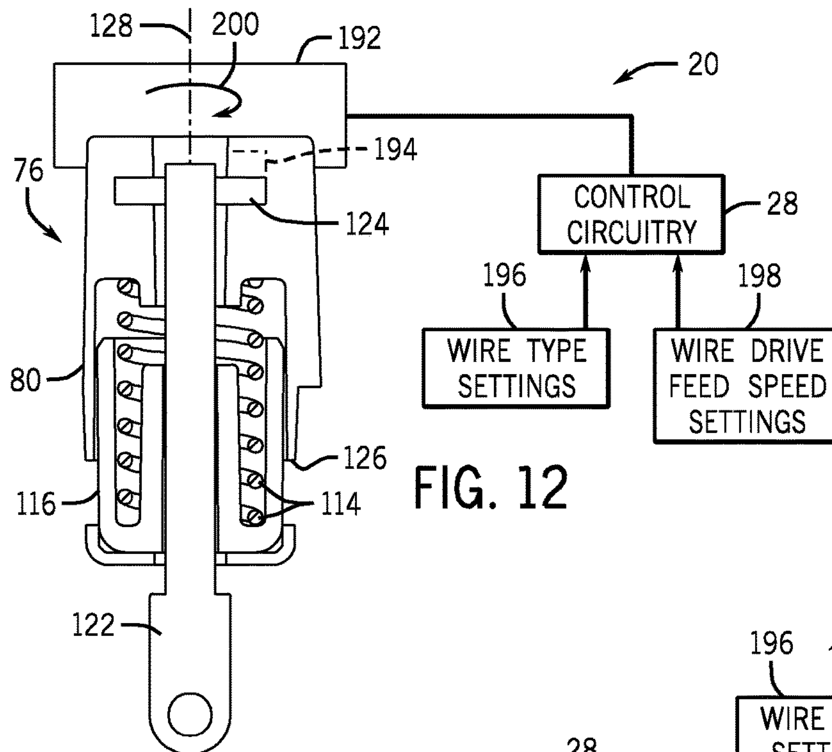
FIG. 12 is a block diagram of an embodiment of certain components of a wire feeder, including a tensioner with a mechanical actuator.

FIG. 12 is a block diagram of an embodiment of the tensioner 76 having a mechanical actuator 192 for rotating the adjustment knob 80 of the tensioner 76. Indeed, the mechanical actuator 192 may rotate the adjustment knob 80 such that the pin 124 aligns with a selected detent 194. This detent 194 may be determined by the control circuitry 28 of the welding wire feeder 20 based at least in part on welding wire type settings 196 and/or welding wire drive feed speed settings 198 of the welding wire feeder 20. That is, the control circuitry 28 may determine a desired compressive force setting based on welding wire type settings 196 (e.g., size or material of the welding wire 24 used) and/or the speed at which the wire drive assembly 32 is feeding the welding wire 24. The selected detent 194 corresponds to the desired compressive force setting, as determined by the control circuitry 28, and the control circuitry 28 may control the mechanical actuator 192 to rotate the adjustment knob 80 such that the pin 124 aligns with the selected detent 194. Thus, the tensioner 76 may automatically adjust the compressive force F applied to the welding wire 24 based on various settings. In certain embodiments, the mechanical actuator 192 may not only align the pin 124 with selected discrete detents 194, but rather may determine an appropriate compressive force F along a broad spectrum of values (i.e., as opposed to discrete settings), and adjust the rotation of the adjustment knob 80 accordingly.

The mechanical actuator 192 may include a motor coupled to the adjustment knob 80 and configured to rotate the adjustment knob 80 about the tensioner axis 128, as shown by arrow 200. Since the adjustment knob 80 is configured to move relative to the tensioning post 122, the pin 124, and other elements of the tensioner 76, the mechanical actuator 192 may be coupled to the adjustment knob 80 and not to the components of the tensioner 76 designed to remain stationary with respect to the tensioner axis 128. Although shown as connected to the adjustment knob 80 from above, any suitable arrangement of mechanical actuator 192 may be used to rotate the adjustment knob 80. For example, the mechanical actuator 192 may engage the lower portion 126 of the adjustment knob 80 through a geared connection to a motor coupled to the tensioner 76.

Components of the welding system 10, such as the wire feeder 20, may include circuitry for determining which detent the pin 124 is aligned with at any given moment. This circuitry may transmit a signal to the control circuitry 28 of the wire feeder 20, the signal relating to the detent with which the pin 124 is currently aligned. For example, the circuitry may be configured to send the signal based on a position of a switch located in the wire feeder 20. The switch, which may be located along the inner wall 44 of the wire feeder 20, may be actuated by the adjustment knob 80 as it is rotated to different positions corresponding to the discrete number of detents and compressive force settings.

Figure 13:
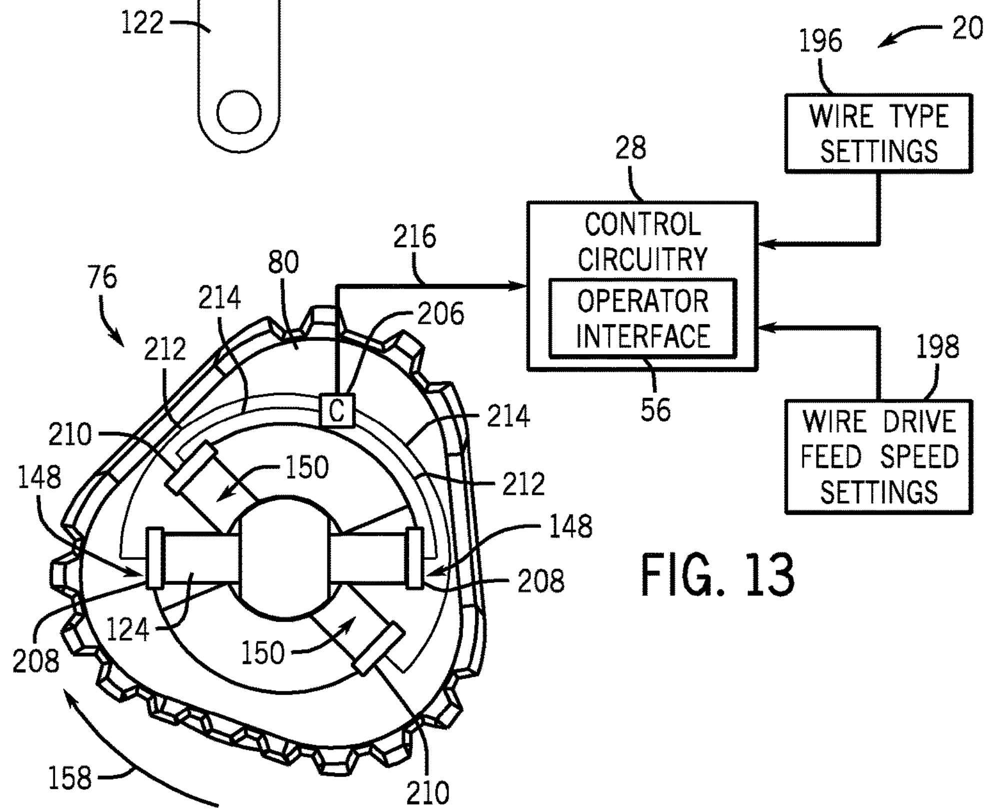
FIG. 13 is a block diagram of an embodiment of certain components of a wire feeder, including an adjustment knob having control circuitry.

FIG. 13 is a block diagram illustrating another embodiment of circuitry 206 configured to determine the detent with which the pin 124 is currently aligned. In this embodiment, the tensioner 76 includes the circuitry 206 incorporated into the adjustment knob 80. Each of the detents 148 and 150 of the adjustment knob 80 may include an opposing pair of leads 208 and 210, respectively. The leads 208 and 210 may be connected through control lines 212 and 214 leading to the circuitry 206. When the pin 124 is aligned with the detent 148, as illustrated, the pin 124 may contact the leads 208 to complete a circuit between the circuitry 206, the leads 208, and the control lines 212. Similarly, when the pin 124 is aligned with the detent 150, the pin 124 may contact the leads 210 to complete a circuit between the circuitry 206, the leads 210, and the control lines 214. In other embodiments, one or more sensors may be molded into the adjustment knob 80, such that when the pin 124 aligns with a given detent, the one or more sensors send a signal to the circuitry 206. The circuitry 206 may be configured to transmit a signal 216 to the control circuitry 28 of the wire feeder 20, and the signal 216 may relate to the detent (e.g., 148) with which the pin 124 is currently aligned.

Based on the signal 216 received from the circuitry 206 of the adjustment knob 80, the control circuitry 28 of the wire feeder 20 may display information on the operator interface 56. The information displayed may relate to the compressive force setting that corresponds to the detent (e.g., 148) with which the pin 124 is currently aligned, as communicated via the transmitted signal 216. For example, the control circuitry 28 may display information on the operator interface 56 that indicates the size and material of welding wire for which the current compressive force setting is appropriate (e.g., steel, aluminum, 0.35 inch diameter, or 3/64 inch diameter welding wire). The control circuitry 28 also may display information on the operator interface 56 indicative of an appropriate wire feed speed for the current compressive force setting, or a general numeral representative of ranges of wire type settings in combination with wire drive feed speed settings. This may allow an operator to confirm that a current position of the adjustment knob 80 corresponds to the welding wire 24 used and/or the desired welding wire drive feed speed.

In some embodiments, the control circuitry 28 may display a message on the operator interface 56 related to a recommended compressive force setting and/or a recommended detent with which to align the pin 124. The recommended setting and/or detent may be based at least in part on the welding wire type settings 196 and/or the welding wire drive feed speed settings 198 of the welding wire feeder 20. These various settings 196 and 198 may be input or selected by an operator through the operator interface 56, allowing the control circuitry 28 to determine a desired compressive force setting and/or corresponding detent based on the settings 196 and 198. The control circuitry 28 may also compare the desired compressive force setting and/or detent with the current compressive force setting and/or the current detent 148, as determined by the circuitry 206 in the adjustment knob 80. Thus, the control circuitry 28 may display a message on the operator interface 56 indicating how to rotate the adjustment knob 80 to bring the pin 124 into alignment with the desired detent.

In certain embodiments, the wire feeder 20 may include a tensioner 76 having both the mechanical actuator 192 of FIG. 12 and the circuitry 206 of FIG. 13. Such a wire feeder 20 may allow for an entirely automated adjustment of the tensioner 76 to apply an appropriate compressive force F to the welding wire 24. For example, the control circuitry 28 may determine that the desired detent is the detent 150, based on the welding wire type settings 196 and/or wire drive feed speed settings 198 input through the operator interface 56. If the pin 124 is aligned with the detent 148, however, the circuitry 206 may transmit a signal 216 that the pin 124 is currently aligned with the detent 148. In response, the control circuitry 28 may control the mechanical actuator 192 to rotate the adjustment knob 80 until the pin 124 is brought into alignment with the desired detent 150.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding wire feeder, comprising:
- a tensioner configured to pivot about a tensioner joint, wherein the tensioner comprises:
  - an adjustment knob comprising a discrete number of detents, wherein the adjustment knob comprises a helical surface adjacent an inner bore of the adjustment knob, wherein the detents are located along the helical surface;
  - a cup assembly about which a lower portion of the adjustment knob is disposed, the cup assembly comprising an inner bore that is coaxial with the inner bore of the adjustment knob;
  - a spring disposed axially between the adjustment knob and the cup assembly;
  - a tensioning post disposed within the inner bores of both the adjustment knob and the cup assembly, wherein the tensioner joint extends through a first end of the tensioning post; and
  - a pin extending from a second end of the tensioning post that is opposite the first end, wherein the pin is configured to align with the detents in the adjustment knob;
- wherein rotation of the adjustment knob adjusts a compressive force transferred from a drive wheel to welding wire among a discrete number of compressive force settings that directly correspond to the discrete number of detents in the adjustment knob.

2. The welding wire feeder of claim 1, wherein the tensioner comprises a mechanical actuator configured to rotate the adjustment knob such that the pin aligns with a selected detent of the adjustment knob.

3. The welding wire feeder of claim 2, comprising control circuitry configured to control the mechanical actuator to rotate the adjustment knob such that the pin aligns with the selected detent based at least in part on welding wire type settings and/or welding wire drive feed speed settings.

4. The welding wire feeder of claim 1, comprising circuitry for determining which detent the pin is currently aligned with, and transmitting a signal relating thereto to control circuitry.

5. The welding wire feeder of claim 4, wherein the control circuitry is configured to display information on an operator interface of the welding wire feeder, wherein the information relates to the compressive force setting that corresponds to the alignment of the pin with the detent based on the transmitted signal.

6. A welding wire feeder, comprising:
- a tensioner configured to pivot about a tensioner joint, wherein the tensioner comprises:
  - an adjustment knob comprising a discrete number of detents, wherein the adjustment knob comprises a helical surface adjacent an inner bore of the adjustment knob, wherein the detents are located along the helical surface;
  - a cup assembly about which a lower portion of the adjustment knob is disposed, the cup assembly comprising an inner bore;
  - a spring disposed axially between the adjustment knob and the cup assembly;
  - a tensioning post, in which a first portion of the tensioning post is disposed within the inner bore of the adjustment knob and a second portion of the tensioning post is disposed within the inner bore of the cup assembly, wherein the tensioner joint extends through a first end of the tensioning post; and
  - a pin extending from a second end of the tensioning post that is opposite the first end, wherein the pin is configured to align with the detents in the adjustment knob;
- wherein rotation of the adjustment knob adjusts a compressive force transferred from a drive wheel to welding wire among a discrete number of compressive force settings that directly correspond to the discrete number of detents in the adjustment knob.

7. The welding wire feeder of claim 6, wherein the tensioner comprises a mechanical actuator configured to rotate the adjustment knob such that the pin aligns with a selected detent of the adjustment knob.

8. The welding wire feeder of claim 7, comprising control circuitry configured to control the mechanical actuator to rotate the adjustment knob such that the pin aligns with the selected detent based at least in part on welding wire type settings and/or welding wire drive feed speed settings.

9. The welding wire feeder of claim 6, comprising circuitry for determining which detent the pin is currently aligned with, and transmitting a signal relating thereto to control circuitry.

10. The welding wire feeder of claim 9, wherein the control circuitry is configured to display information on an operator interface of the welding wire feeder, wherein the information relates to the compressive force setting that corresponds to the alignment of the pin with the detent based on the transmitted signal.

* * * * *